(12) United States Patent
Underwood (10) Patent No.: US 9,096,445 B2
(45) Date of Patent: Aug. 4, 2015

(54) WATER PURIFICATION APPARATUS

(75) Inventor: Lee Underwood, High Wycombe (GB)

(73) Assignee: VWS (UK) Limited, Marlow, Bucks (GB)

( * ) Notice: Subject to any disclaimer, the term of this patent is extended or adjusted under 35 U.S.C. 154(b) by 217 days.

(21) Appl. No.: 13/123,877

(22) PCT Filed: Oct. 14, 2009

(86) PCT No.: PCT/GB2009/051369
§ 371 (c)(1),
(2), (4) Date: Apr. 12, 2011

(87) PCT Pub. No.: WO2010/043898
PCT Pub. Date: Apr. 22, 2010

(65) Prior Publication Data
US 2011/0192790 A1  Aug. 11, 2011

(30) Foreign Application Priority Data
Oct. 16, 2008 (GB) .................................. 0818924.3

(51) Int. Cl.
| | |
|---|---|
| *B01D 21/30* | (2006.01) |
| *B01D 21/24* | (2006.01) |
| *B01D 35/00* | (2006.01) |
| *C02F 9/00* | (2006.01) |
| *B01L 3/02* | (2006.01) |
| *C02F 1/32* | (2006.01) |
| *C02F 1/42* | (2006.01) |

(Continued)

(52) U.S. Cl.
CPC ............... *C02F 9/005* (2013.01); *B01L 3/0293* (2013.01); *C02F 1/32* (2013.01); *C02F 1/42* (2013.01); *C02F 1/441* (2013.01); *C02F 1/4695* (2013.01); *C02F 2103/04* (2013.01); *C02F 2209/40* (2013.01)

(58) Field of Classification Search
None
See application file for complete search history.

(56) References Cited

U.S. PATENT DOCUMENTS

| | | | |
|---|---|---|---|
| 4,557,399 A | * | 12/1985 | Redick, Jr. ................... 222/83.5 |
| 4,784,763 A | | 11/1988 | Hambleton et al. |

(Continued)

FOREIGN PATENT DOCUMENTS

| | | |
|---|---|---|
| GB | 2 179 646 | 3/1987 |
| WO | WO 03/076342 | 9/2003 |

OTHER PUBLICATIONS

XP-002562331, arium®—Flexible Systems for Ultrapure Laboratory Water, Goettingen, Nov. 2001, 5 pgs.

(Continued)

*Primary Examiner* — Nam Nguyen
*Assistant Examiner* — Richard Gurtowski
(74) *Attorney, Agent, or Firm* — Drinker Biddle & Reath LLP (57) ABSTRACT

A water purification apparatus comprising at least: (a) one or more water purification components in a housing; and (b) a handset integral with the housing, and moveable between a supported position on the housing and a suspended position beyond the housing, the handset including one or more water purification controls thereon. In this way, at least one control of the purification of the water in the housing is operative on the handset, which handset is useable either in its supported position on the housing or in its suspended position beyond the housing, whichever is most convenient to the user. More convenience is therefore provided to a user by the present invention compared with conventional purification apparatus.

17 Claims, 5 Drawing Sheets

(51) Int. Cl.
  *C02F 1/44* (2006.01)
  *C02F 1/469* (2006.01)
  *C02F 103/04* (2006.01)

(56) References Cited

U.S. PATENT DOCUMENTS

| | | | | |
|---|---|---|---|---|
| 4,883,355 | A | * | 11/1989 | Saghatchi et al. ......... 356/241.6 |
| 5,184,309 | A | | 2/1993 | Simpson et al. |
| 5,925,240 | A | | 7/1999 | Wilkins et al. |
| 5,988,435 | A | | 11/1999 | Edwards et al. |
| 6,101,452 | A | | 8/2000 | Krall et al. |
| 2004/0211790 | A1 | * | 10/2004 | Werth ........................... 222/212 |
| 2005/0095723 | A1 | * | 5/2005 | DiTrolio et al. .............. 436/180 |
| 2006/0191829 | A1 | | 8/2006 | Larkner et al. |
| 2008/0078723 | A1 | | 4/2008 | Larkner |
| 2008/0221469 | A1 | * | 9/2008 | Shevchuk ..................... 600/532 |

OTHER PUBLICATIONS

XP-002562332, arium 611VF Water Purification System, Installation & Operation Manual, Apr. 2002, 36 pgs.

International Search Report, dated Jan. 25, 2010.

International Preliminary Report on Patentability and Written Opinion, dated Apr. 28, 2011, 7 pages.

Barnstead/Thermolyne Corporation, Type D11981 Remote Dispenser, Operation Manual and Parts List, LT1198X1, Jul. 7, 2000, pp. 1-12.

Toyo Roshi Kaisha, Ltd. & Advantec Toyo Kaisha, Ltd., ADVANTEC General Catalog 2007/2008, Japan, Oct. 2006, pp. 52 and 54.

Japanese Search Report for Application P2011-531568, dated Apr. 2, 2013, 8 pages.

* cited by examiner

WATER PURIFICATION APPARATUS

FIELD OF THE INVENTION

The present invention relates to water purification apparatus, particularly but not exclusively for laboratory water.

BACKGROUND

Water purification apparatus and units for use in laboratories and healthcare facilities are well known. Generally they involve the reduction and/or removal of contaminants and impurities to very low levels. They typically contain a variety of technologies that remove particles, colloids, bacteria, ionic species and organic substances and/or molecules.

Conventionally, water purification apparatus are complete one-piece units, having a fixed point of dispense and all parts or components and controls and operations housed within a single housing. An example is shown in FIG. 1 of our WO03/076342A1.

US 2006/0191829 A1 shows a proposed water dispensing device for dispensing water at a location remote from a water purification unit, including a dispensing gun and a support structure for the dispensing gun. The water dispensing device is equipped with a flow control valve operative for selectively directing a stream of water from the manifold in the main purification unit to the dispensing gun. The support structure can include a user interface and display. US 2008/00078723 A1 discloses wireless methods for dispensing water supplied by a main purification unit to a remote dispensing device.

SUMMARY OF THE INVENTION

An object of the present invention is to provide improved water purification apparatus.

Thus, according to one aspect of the present invention, there is provided a water purification apparatus comprising at least:
  (a) one or more water purification components in a housing; and
  (b) a handset integral with the housing, and moveable between a supported position on the housing and a suspended position beyond the housing, the handset including one or more water purification controls thereon.

In this way, at least one control of the purification of the water in the housing is operative on the handset, which handset is useable either in its supported position on the housing or in its suspended position beyond the housing, whichever is most convenient to the user. More convenience is therefore provided to a user by the present invention compared with conventional purification apparatus.

Purified water provided by the water purification apparatus of the present invention is created by the reduction and/or removal of any or one or more of the contaminants and impurities in a supply water stream, by the water purification components in the housing. This can involve the reduction and/or removal of one or more of the following: particles, colloids, bacteria, micro-organisms, ionic species, organic substances and organic molecules.

The water purification apparatus may comprise any number of water purification components, as well as other devices, parts, lines, etc, including but not limited to one or more of the following: pumps, meters, oxidisers, de-ionisers, valves, sensors, drains, controllers, control units and mechanisms, taps, filters, membranes. Generally, the water purification control(s) operate through a controller in the water purification apparatus to control one or more aspects or processes of the water purification. One or more controllers may be located in the housing, handset or both, to operate the water purification apparatus.

Water purification apparatus are known in the art, and are generally intended to provide purified water, preferably as a purified water stream, having a conductivity of less than 1 $\mu$S/cm, preferably less than 0.1 $\mu$S/cm, more preferably less than 0.067 $\mu$S/cm, at 25° C. This can be equated to the purified water stream having a resistivity of at least 1 M$\Omega$-cm, preferably at least 10 M$\Omega$-cm, more preferably at least 15 M$\Omega$-cm. Additionally, purity specifications can be made for organic species to content levels of less than 500 ppb of total organic carbon (TOC), preferably less than 50 ppb; bacteria to levels less than 100 colony forming units (cfu) per millilitre, preferably less than 1 cfu/ml; and for dissolved oxygen and/or particles.

Such water purification apparatus generally only provide up to 1000 litres of purified water per hour, such as up to 5 l/min.

Such water purification apparatus are generally 'stand alone' units, generally only requiring connection to nearby water and electricity supplies to be operable. Thus, they are generally independent and/or moveable units operating in or at a specific location such as a laboratory. Preferably, at least the majority of the purification actions or processes occur within the housing. They are intended to provide a purified water stream only, such stream not being in combination with any other substance or compound.

The dispense of at least a portion of the purified water can be provided through any form or type of outlet or outlets, optionally being co-ordinated or separate.

The water purification apparatus may have a dispense mode or other such form of operation, and a recirculation mode. Preferably, the point of dispense involves at least one valve, more preferably operable between a dispense position and a recirculating position. One or more valves may also provide control over the volume and/or rate of flow of the purified water at the dispense.

The dispense may involve the dispense of all of the purified water being provided by the water purification apparatus, such as whilst the water purification apparatus is in a dispense mode. Optionally, a portion of the purified water may be contemporaneously or simultaneously recirculated through at least a portion of the water purification apparatus whilst the remainder of the purified water is being dispensed.

The movement of water through a water purification apparatus is generally provided by the use of one or more pumps known in the art, and not further discussed in detail herein.

Preferably, the water purification components include at least one de-ioniser, and optionally one or more oxidisers such as an ultraviolet light emitter.

One common oxidiser involves the use of ultraviolet light, and the ultraviolet treatment of water for decomposing organic compounds or substances in water is well known in the art. Generally, ultraviolet light is able to decompose many organic compounds and substances that are contained or are residues in generally available water, by oxidising them to form ionic species. Apparatus and instruments for providing suitable ultraviolet light are well known in the art, and typically involve emitting ultraviolet light at one or more specific wavelengths in an area or space through which the water passes. The or each oxidiser can be provided as a distinct component, typically a separable component such as a replaceable cartridge, having an ultraviolet emitter therein around which the water stream passes from an inlet to an outlet. The purification of water in the present invention may involve one or more oxidisers, being in series, parallel or both.

Ionic species in the feedwater (and those created by any oxidiser(s)) are generally removed from the water stream to provide purified water by the use of one or more de-ionisers such as ion-exchangers and reverse osmosis units. Many types and forms of de-ionisers are known in the art, and include, but are not limited to, one or more of the following; (electro)deionisation apparatus or units, reverse osmosis (RO) units or apparatus, resins and zeolites. The action and operation of de-ionisers is well known in the art, and they are not further described in detail herein.

A water purification apparatus or unit may comprise a plurality of de-ionisers, including one or more "pre-treatment" de-ionisers upstream of any oxidiser, as well as one or more de-ionisers downstream of any oxidiser.

In general, the water purification apparatus of the present invention at least comprises: a water inlet, a pump, a de-ioniser, and a water outlet (for dispense of the purified water).

The suspended position of the handset may allow the handset to be in a 'free' position in general. Alternatively, it may be desired and/or required that the handset in its suspended position is in a hand-holdable position by a user.

The housing of a water purification apparatus according to the present invention may be of any suitable shape, size and design. The housing may be adapted to be self-supporting, and/or be able to be mounted on a wall or other suspended position. The housing preferably includes all the physical water purification components of the water purification apparatus, which physical components provide the reduction and/or removal of contaminants and impurities as discussed herein.

The housing may also include a holster for the handset. The holster may have any suitable size, shape and design, usually being complementary to the shape, size and design of the handset. For example, the holster may have one or more optionally tapering sleeves, arms, grooves or ridges, which locate with corresponding surfaces, arms, grooves or ridges on or around the handset. Such a holster could provide the supported position of the handset on the housing.

The handset is integral with the housing by being permanently connectable therewith. In one embodiment of the present invention, there is provided a flexible neck between the housing and the handset. The neck preferably provides the ability of the handset to be moveable between its supported position on the housing and its suspended position beyond the housing.

In one embodiment of the present invention, the neck has a non-circular cross-section. That is, the neck does not comprise a generally circular cross-sectional form of tubing, such as conventionally provided in smooth, ridged or spiralled form as an outer conduit or sheath around one or more water conduits.

Preferably, the cross-section of the neck has one or more lines or planes of symmetry, with or without a regular circumferential outline. The outline of the neck along its length between the housing and the handset may also be smooth or non-smooth, and/or changing or non-changing.

In one embodiment of the present invention, the neck has an elongate-linear configuration. That is, the neck is elongate between the housing and the handset, and its cross-section along its length is generally linear, having a width greater than its height.

In another embodiment of the present invention, the neck comprises one or more conduits, optionally being one or more water conduits and one or more electrical conduits. Where the handset includes a purified water dispense, or point of use, the neck preferably comprises at least one water conduit. Where the handset includes a water pathway for the purified water, such that non-dispensed purified water can be returned to the housing, the neck preferably comprises two or more water conduits, generally being a first conduit for flow of purified water into the handset, and a second water conduit for return flow of non-dispensed purified water back to the housing.

The neck preferably comprises at least one electrical conduit able to provide electrical communication between the or each water purification control on the handset and the one or more water purification components in the housing.

Conventionally, conduits such as those shown labelled 82 in FIG. 2 of US2006/0191829 A1 are bundled together or otherwise coincidental in their passage between a support structure and a dispensing gun.

In one embodiment of the present invention, the neck includes one or more water conduits and one or more separated electrical conduits. That is, the passage of at least one of the electrical conduits along the neck is separated from the passage of at least one of the water conduits. The separated position of the or each electrical conduit is preferably physically distinct from the passage of the at least one water conduit, preferably in a non-touching position and having at least a portion of the neck thereinbetween.

In this way, the neck of the present invention is able to provide separated passage for at least one of the electrical conduits and at least one of the water conduits, preferably all of the electrical conduits and all of the water conduits in the neck, reducing problems associated by such conduits otherwise being together, touching or coincidental.

The neck of the present invention may be made from any suitable material or combination of materials, optionally comprising one or more supportive and/or strengthening lines or rods therein to assist the movement and/or suspension of the handset.

According to another embodiment of the present invention, the neck is formed from a resilient material or combination of materials, able to be deformed in one or more directions by force, but returned to its original shape and/or position upon release of such force. Resilient materials include many forms of plastic, including silicones. For example, the neck could be formed from a resilient plastic strip, preferably a silicone strip. Such a strip could be formed by extrusion or pultrusion with the desired cross-sectional shape, into which one or more water conduits and/or one or more electrical conduits can be fitted or otherwise located.

Thus, the present invention is able to provide a water purification apparatus having a neck between a housing and a handset able to provide significant freedom of movement to the handset between its supported position on the housing and a suspended position beyond the housing, with operational improvements in the nature and material of the neck, whilst the neck preferably also has resilience to return to its original shape, configuration and/or position.

Purified water may be dispensed from the water purification apparatus from one or more dispense points, preferably including via the handset in its supported and/or suspended positions, and optionally via one or more other dispense points on the housing or remote therefrom.

According to another embodiment of the present invention, the handset includes a display. The display may have any suitable size, shape and configuration, and generally comprises one or more display portions and/or cells, able to provide visual information to a user. Such information may include one or more figures and/or parameters concerning the operation of one or more parts or components of the water purification apparatus. Such information could include one or more readings and/or measurements of a parameter such as purity, conductivity, resistivity, flow, speed, temperature of the water purification apparatus and/or of one or more of the water purification components in the housing. The nature and provision of such information is known to those skilled in the art and is not further discussed herein.

In another embodiment of the present invention, the handset includes a water pathway for purified water. The water pathway may include the provision of purified water from the housing through a water conduit in a neck as described hereinbefore, optionally including a recirculation loop such that non-dispensed water in the handset can then return to the housing via a second water conduit in the neck.

According to another embodiment of the present invention, the handset includes a purified water dispense. That is, the handset includes at least one outlet or point of dispense as described hereinabove.

In another embodiment of the present invention, the water purification apparatus includes one or more volumetric dispense means. Such means are well known in the art, and allow the water purification apparatus to dispense a required and/or desired volume of purified water from the dispense, such volume generally being preset by the user. Methods and apparatus for providing for volumetric dispense are known in the art, and generally include at least one user control for setting and/or controlling the volumetric dispense.

In another embodiment of the present invention, the handset includes a purified water dispense flow control, adapted to provide the user with control of the flow of the purified water at or through the dispense. Such a control may be operative electronically and/or manually, and is preferably located on top of the handset.

Conventionally, an external trigger 90 shown on the dispenser 56 in US 2006/0191829 is useable in a manual mode of operation, and an automatic or volumetric mode of operation.

According to another embodiment of the present invention, the purified water dispense flow control includes movement control proportional to discharge flow rate. That is, movement of the flow control provides proportional operation of the flow of purified water through the dispense point or dispenser, rather than the flow being a function of the valve's operation parameters, or its materials of construction, or other system process parameters such as check valve pressures, pump pressures etc. U.S. Pat. No. 5,925,240, incorporated herein by way of reference, shows in its FIG. 6 an example of a dispense control achievable by the flow controller of present invention wherein the outflow rate can be a direct function of the input device. It is possible to select and program the dispense outflow rate as graphically shown in FIG. 6 of U.S. Pat. No. 5,925,240, for example as a sine curve with an initially flat and subsequently steeper rise.

In another embodiment of the present invention, the handset includes one or more physical and/or electronic input controls able to operate or enabled to vary one or more of the variable operations of the water purification apparatus, usually through one or more internal controllers. That is, at least one process or action of at least one of the water purification components in the housing is varyingly operable by the user via one or more of such input controls. The input control(s) may be any activation or switch or control means known in the art such as buttons, dials, potentiometers, etc., as well as combinations thereof.

According to another embodiment of the present invention, one or more of the water purification input controls on the handset is enabled to allow the programming of the water purification apparatus by a user, so as to allow the user to temporarily and/or permanently vary a programmed operation of one or more of the water purification components, such as pump speed, flow, purity, etc.

In this way, one or more of the water purification input controls on the handset provides control over at least one of the water purification components in the housing. Thus, control of one or more of the purification processes of the water purification apparatus can be carried out by and through the handset. This provides significantly more convenience to a user, by allowing such operations to be carried out by and through the handset rather than being limited to only being operable by static controls on the housing.

According to another embodiment of the present invention, the water purification apparatus has a handset comprising a user interface. More preferably, the user interface comprises all the water purification controls, such as input controls, and/or flow controls and/or controllers, required for the water purification apparatus. Thus, complete control of the water purification apparatus can be provided via the handset, without the user needing to reach the housing. In this way, the housing can be located in a more suitable operational position, such as on a wall or in an otherwise storage location, whilst the user has full operation and control of the water purification apparatus via the handset in its suspended position beyond the housing. The housing does not therefore need to occupy a position, such as on a workbench, which a user may not consider convenient.

The above embodiments of the present invention provide a water purification apparatus with a number of advantages, not limited to one or more of the following.

Firstly, the handset is moveable to a suspended position, optionally hand-holdable by a user, to allow easier operation by a user than being static or fixed on the housing.

Secondly, a user does not require to reach the housing, which may be located in an inconvenient position, compared with moving the handset to a more user convenient position, whilst still being able to control the purification of the water in the water purification apparatus.

Thirdly, where the handset includes a purified water dispense, the user is able to control, such as program, the water purification apparatus to suit the required and/or desired purified water dispense from the same handset.

Fourthly, where the handset includes a display, the user is able to move the handset to a more suitable and/or convenient position for visually reading the display on the handset, rather than trying to read a static display on a housing.

Fifthly, one or more users of the water purification apparatus not requiring purified water dispense, such as a service engineer, is able to move the handset to a more suitable and/or convenient position to obtain information concerning the water purification apparatus.

According to a second aspect of the present invention, there is provided a purified water distribution apparatus comprising at least:
  (a) one or more purified water distribution components in a housing; and
  (b) a handset integral with the housing, and moveable between a supported position on the housing and a suspended position beyond the housing, the handset including one or more water flow controls thereon.

The purified water provided by the distribution apparatus may be as hereinbefore defined, and is created by the reduction and/or removal of any or one or more of the contaminants and impurities in a supply water stream. Such purified water can be supplied by one or more water purification components hereinbefore defined, optionally in a nearby or remote location, and optionally in a separate and/or independent apparatus, unit or housing.

The distribution apparatus may comprise any number of purified water distribution components, as well as other devices, parts, lines, etc, including but not limited to one or more of the following: pumps, sensors, meters, (additional or supplementary) oxidisers and/or de-ionisers, valves, drains, controllers, taps, filters, membranes.

Such water distribution apparatus are generally units connected to water purification apparatus to distribute the purified water stream provided therefrom to one or more separate, usually remote, locations. Thus, they are generally independent and/or mobile units having one or more water dispense points. They are intended to provide a purified water stream only, such stream not being in combination with any other substance or compound.

The water flow control(s) on the handset of such a water distribution apparatus may be able to control the flow of water either from one or more remote dispense points, and/or control internal flow around part or all of the water distribution apparatus such as during a sanitisation or cleaning program.

Embodiments and advantages of the purified water distribution apparatus of the present invention are co-incidental with the embodiments and advantages of the water purification apparatus of the present invention described herein.

The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements from any of the embodiments to describe additional embodiments.

BRIEF DESCRIPTION OF THE DRAWINGS

Embodiments of the present invention will now be described by way of example only, and with reference to the accompanying diagrammatic drawings in which.

DESCRIPTION OF THE PREFERRED EMBODIMENTS

Figure 1:
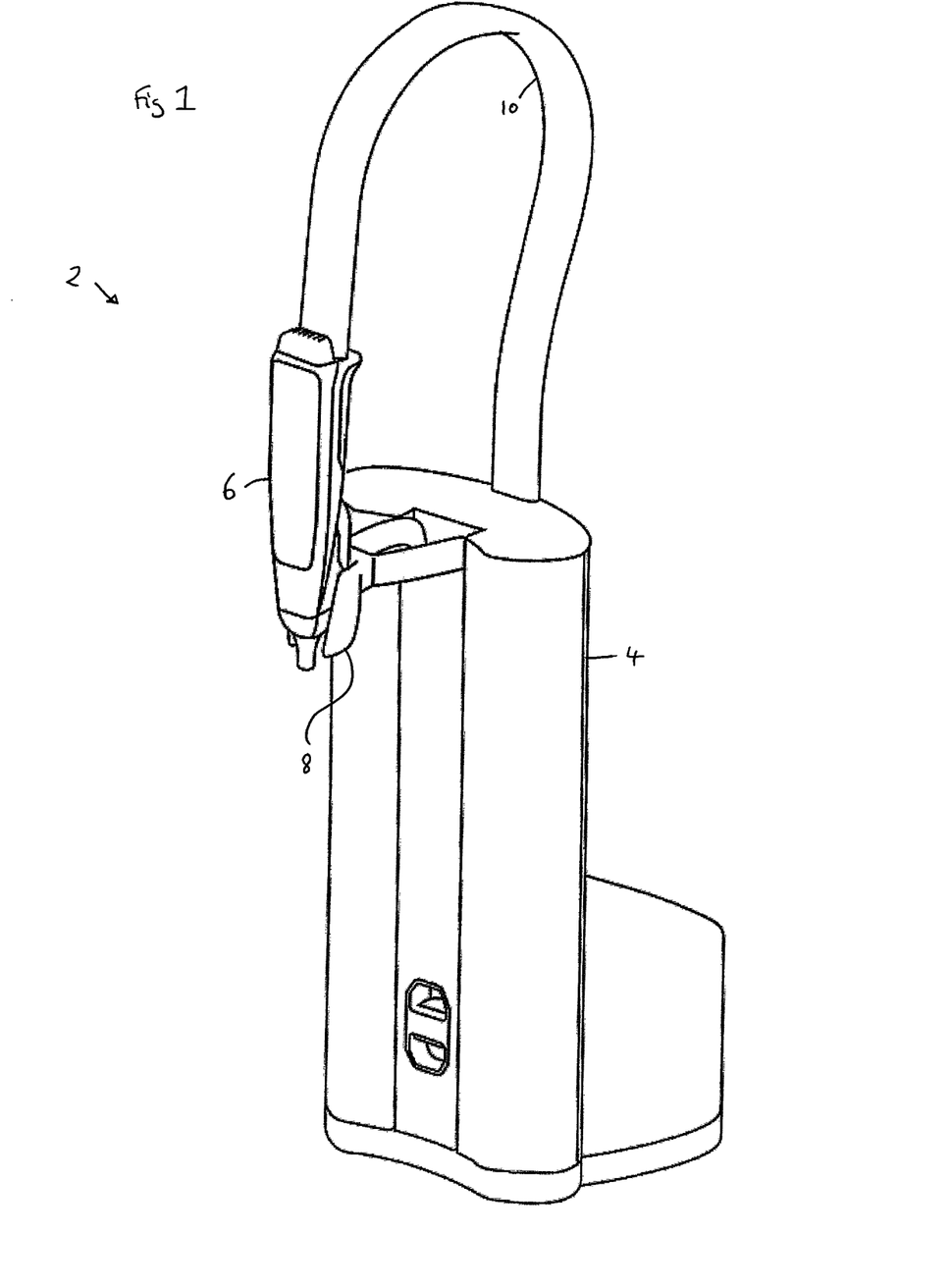
FIG. 1 is a perspective view of a first water purification apparatus in a first configuration according to one embodiment of the present invention.

Referring to the drawings, FIG. 1 shows a first water purification apparatus 2 comprising a housing 4 and a handset 6.

Within the housing 4, there are one or more water purification components comprising at least one de-ioniser, and optionally at least one oxidiser, preferably an ultraviolet light emitter. Such components may be integral and/or separable from the housing, such as cartridges known in the art. The specific water purification components in the housing 4 and their operation are not shown for clarity purposes, and as these are well known in the art.

The water purification apparatus is supplied with a water supply stream (not shown) which may comprise any source of water, generally being a potable water source that may or may not have been partially pre-purified or filtered, generally available to a user from a mains supply or other continuous or large supply.

The housing 4 includes a holster 8 for the handset 6, which holster 8 may be integrally formed with the housing 4, or may be a bracket attachable to the housing 4.

Figure 2:
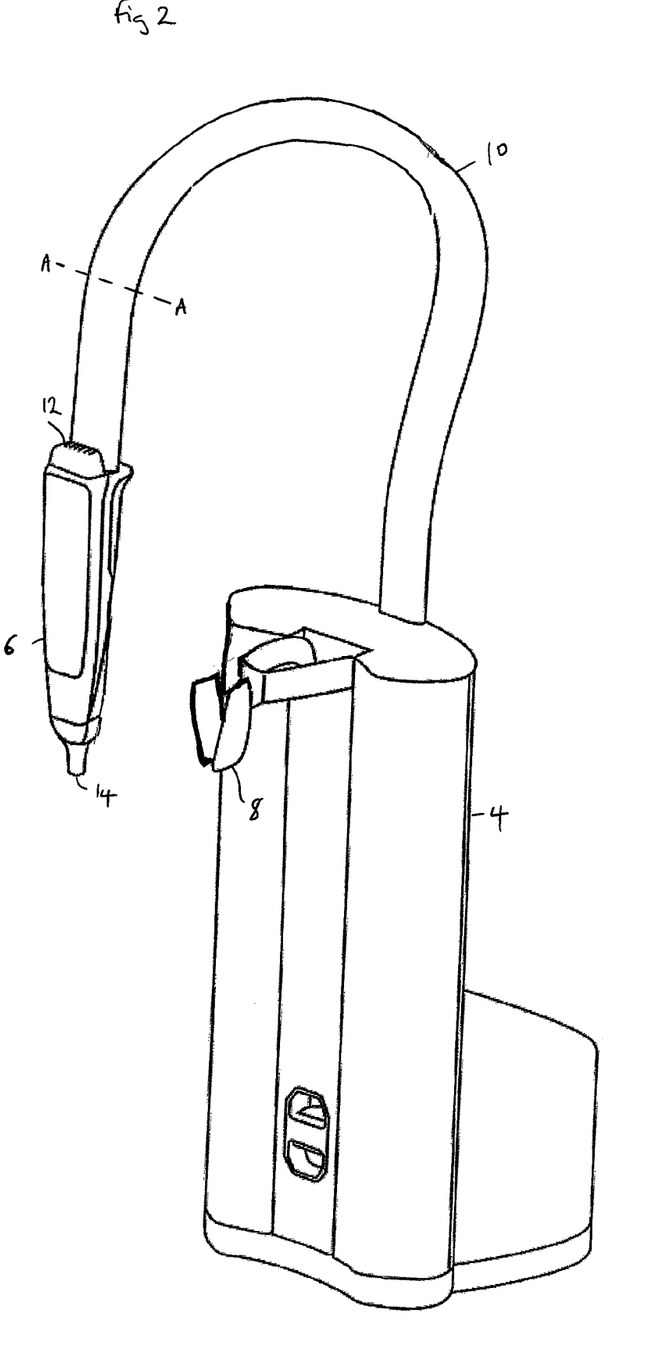
FIG. 2 is a view of the apparatus shown in FIG. 1 in a second configuration.

Between the housing 4 and the handset 6 there is a flexible neck 10. The neck provides that the handset 6 is integral with the housing 4, whilst being movable between the supported position on the housing 4 as shown in FIG. 1, and a suspended position beyond the housing as shown in FIG. 2. The handset 6 in its suspended position in FIG. 2 may be self-supported, or may be in a hand-holdable position by a user (not shown).

On top of the handset 6 there is a purified water dispense flow control 12, and at the bottom of the handset 6 there is a purified water dispense 14. These are described in more detail in relation to FIG. 4 hereinafter.

The first water purification apparatus 2 of the present invention can provide for dispense of purified water whilst the handset 6 is in its supported position on the housing 4. Such dispense may be from a separate fixed dispense (not shown) on the first water purification apparatus 2, and/or from the handset 6 whilst in its supported position by locating a collection vessel next to the housing 4 and directly under the dispense 14 of the handset 6.

FIG. 2 shows the movement of the handset 6 to a more suitable or convenient location for use by a user, especially where the housing 4 is located in a less-accessible position, such as high up on a wall and/or in a limited space. As the handset 6 includes a purified water dispense 14, this may provide the user with a more suitable and/or convenient method of dispensing purified water to a collection vessel, especially a collection vessel of a non-regular or larger size not usually locatable directly under the fixed dispense point on the housing of a conventional water purification apparatus.

Figure 3:
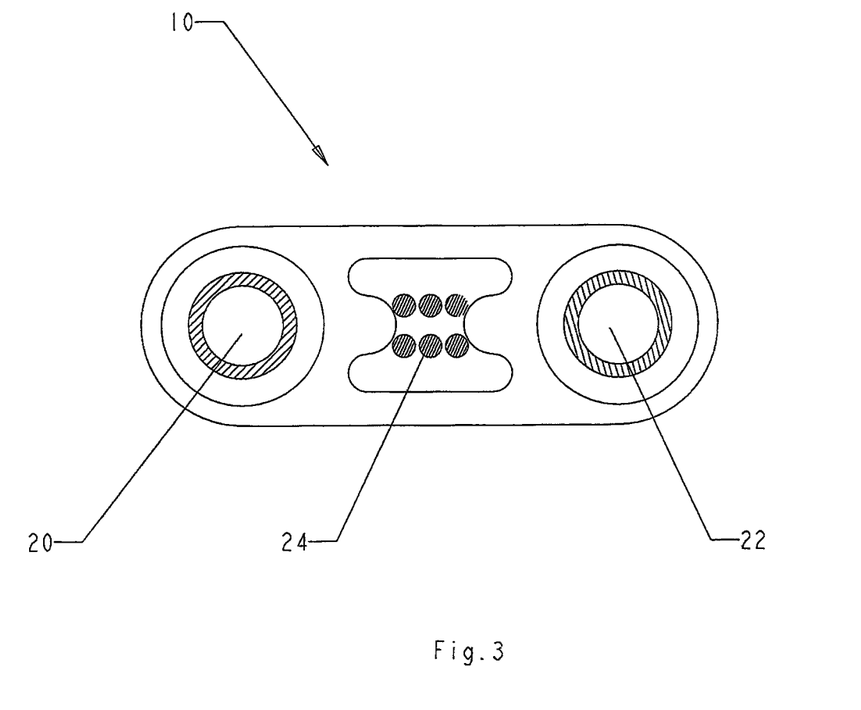
FIG. 3 is a cross-sectional view of the neck of the apparatus in FIG. 2 along lines A-A'.

FIG. 3 is a cross-sectional view of the neck of the apparatus in FIG. 2 along lines A-A'. The neck 10 comprises a non-circular cross-section being elongate (as shown in FIGS. 1 and 2) and having a linear configuration as shown in FIG. 3, having a width greater than its height.

The neck 10 includes a first water conduit 20 such as able to provide a flow of purified water from the housing 4 to the handset 6, and a second water conduit 22 such as able to provide return of a circulation of a non-dispense purified water stream from the handset 6 to the housing 4. Flow and return water conduits between a main housing and a point of dispense are known in the art, and generally provide a recirculation loop to maintain purity of a water stream during periods of partial dispense or non-dispense.

FIG. 3 shows that the neck 10 also comprises an electrical conduit 24, which is clearly separated and distinct from the first and second water conduits 20, 22, particularly by having a portion of the neck 10 therebetween. This minimises and/or avoids any problem between the water and electrical conduits that can be caused by such being coincidental.

Figure 4:
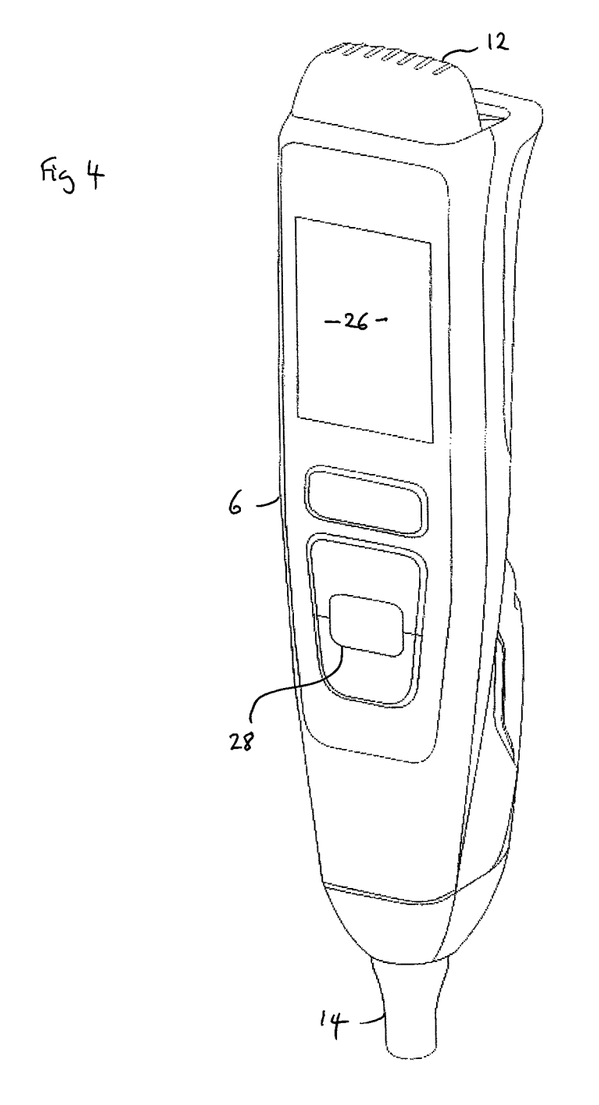
FIG. 4 is a front perspective view of the handset of the apparatus in FIG. 1.

FIG. 4 is a front perspective view of the handset 6 shown in FIGS. 1 and 2. FIG. 4 shows the purified water dispense flow control 12 on the top of the handset 6, and a purified water dispense 14 at the bottom of the handset 6. On the handset 6, preferably on a front face, there is a display 26 and one or more water purification input controls 28 as described hereinabove. Preferably, the display 26 and the water purification input controls 28, optionally in combination with the purified water dispense flow control 12, provide a user interface able to control all processes and components of the water purification apparatus, such as the first water purification apparatus shown in FIGS. 1 and 2.

Figure 5:
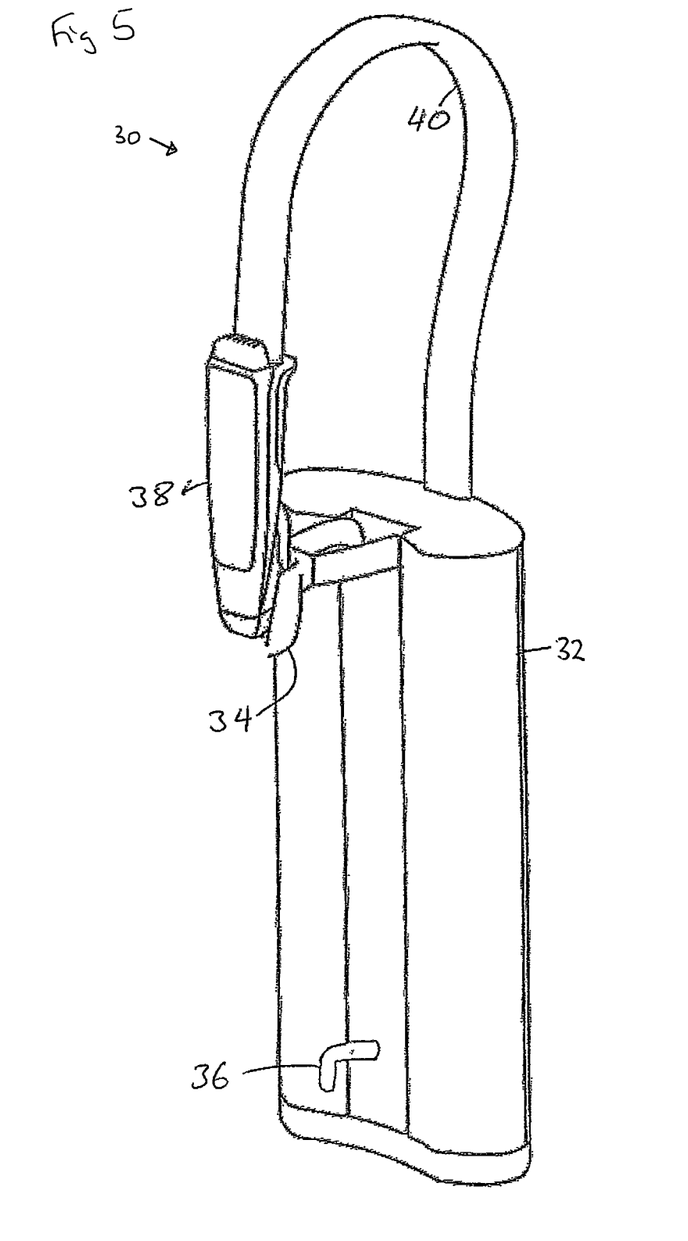
FIG. 5 is a perspective view of a water purification apparatus according to a second embodiment of the present invention.

FIG. 5 shows a second water purification apparatus 30, having a housing 32 on which is located a holster 34 and a purified water dispense 36. The second water purification apparatus 30 also comprises a handset 38, and a neck 40 between the handset 38 and the housing 32. The second water purification apparatus 30 may be located on a wall, and shows that the housing 32 may still comprise the purified water dispense 36, whilst the handset 38 is moveable between a supported position on the housing 32 using the holster 34 (as shown), and a suspended position beyond the housing 38 (similar to as shown FIG. 2) which is more convenient and/or suitable to a user independent of the purified water dispense 36. Such a user may be a service engineer or the like, not requiring purified water dispense, but requiring information concerning operation of the water purification apparatus 30.

It will be appreciated that although specific embodiments of the invention have been described herein for the purposes of illustration, various modifications may be made without deviating from the spirit of the scope of the invention.

For example, FIGS. 1-5 could also represent a purified water distribution apparatus comprising a housing and a handset, having a purified water dispense either on the housing or the handset or both, and able to distribute a purified water stream provided from a separate water purification apparatus located nearby (such as underneath the location of the water distribution apparatus such as a work bench), or remotely (such as in a separate room). The operations of the purified water distribution apparatus and handset could be equivalent to those described above in relation to FIGS. 1-5.

The invention claimed is:

1. A water purification apparatus comprising at least:
   (a) one or more water purification components in a housing;
   (b) a handset attached to the housing through a flexible neck, the handset being moveable relative to the housing, the handset including:
      i. one or more water purification controls thereon for controlling one or more of the water purification components,
      ii. a water pathway for purified water, the pathway adapted to provide a purified water dispense from the handset, and
      iii. a user interface, the handset being moveable between a supported position on the housing and a suspended position separated from the housing where the handset is not supported on the housing;
   (c) the flexible neck being external from the housing and providing an attachment between the housing and the handset, the flexible neck adapted to permit the movement of the handset relative to the housing and to provide support for the handset in its suspended position, the flexible neck including:
      (i) one or more water conduits located in the flexible neck, the water conduits configured to provide the purified water between the housing and the handset, and
      (ii) one or more separated electrical conduits located in the flexible neck, the electrical conduits configured to provide electrical communication between the water purification controls on the handset and the water purification components in the housing.

2. A water purification apparatus as claimed in claim 1 wherein in the suspended position of the handset the handset can be grasped by a user.

3. A water purification apparatus as claimed in claim 1 wherein the housing includes a holster for the handset.

4. A water purification apparatus as claimed in claim 1 wherein the flexible neck has a non-circular cross-section.

5. A water purification apparatus as claimed in claim 1 wherein the flexible neck has an elongate-linear configuration.

6. A water purification apparatus as claimed in claim 1 wherein the flexible neck is a resilient silicone strip.

7. A water purification apparatus as claimed in claim 1 wherein the handset includes a display.

8. A water purification apparatus as claimed in claim 1 wherein the handset includes a purified water dispense flow control located on the top of the handset.

9. A water purification apparatus as claimed in claim 8 wherein the flow control includes movement control proportional to dispense flow.

10. A water purification apparatus as claimed in claim 1 wherein the handset includes one or more variable input controls of the water purification apparatus.

11. A water purification apparatus as claimed in claim 10 wherein one or more of the water purification input controls on the handset is enabled to allow programming of the water purification apparatus by a user.

12. A water purification apparatus as claimed in claim 1 wherein the user interface comprises controls required for effectively controlling operation of the water purification apparatus.

13. A water purification apparatus as claimed in claim 1 including volumetric dispense means.

14. A water purification apparatus as claimed in claim 1 wherein the water purifying components include at least one de-ioniser.

15. A water purification apparatus as claimed in claim 1 wherein there are at least two water conduits in the flexible neck, wherein one of the water conduits is adapted to channel purified water to the handset, and wherein another of the water conduits is adapted to channel non-dispensed purified water from the handset to the housing, and wherein a portion of the flexible neck separates the two water conduits.

16. A water purification apparatus comprising at least:
   one or more water purification components in a housing;
   a handset attached to the housing through a flexible neck, the handset being moveable relative to the housing, the handset including:
      one or more water purification controls thereon for controlling one or more of the water purification components,
      a water pathway extending through at least a portion of the handset to a dispenser on the handset, the pathway adapted to channel a purified water through at least a portion of the handset to the dispenser, and
      a user interface on the handset for permitting user control over dispensing of purified water,
      the handset being moveable between a supported position wherein the handset is removably mounted on the housing and a suspended position wherein the handset is separated from the housing; and
   the flexible neck attached to the housing and the handset, the flexible neck being external from the housing, the flexible neck including:
      one or more water conduits located in and extending through the flexible neck and connected at one end to a purified water supply inside the housing and at the other end to the handset, and
      one or more electrical lines located in and extending through the flexible neck and connected at one end to the water purification components in the housing and at the other end to the water purification controls, the electrical lines providing electrical control of the water purification components in the housing through use of the water purification controls on the handset; and wherein the one or more water conduits are separated from the one or more electrical lines by a portion of the flexible neck so that the water conduits and the electrical conduits do not contact one another.

17. A water purification apparatus as claimed in claim 1 wherein the one or more water conduits are separated from the one or more separated electrical conduits by a portion of the flexible neck so that the water conduits and the electrical conduits do not contact one another.

\* \* \* \* \*